|  |  |  |  |
|---|---|---|---|
| United States Patent [19] | | [11] Patent Number: | 4,490,512 |
| Katz | | [45] Date of Patent: | Dec. 25, 1984 |

[54] OLEFIN METATHESIS

[75] Inventor: Thomas J. Katz, New York, N.Y.

[73] Assignee: The United States of America as represented by the Secretary of the Navy, Washington, D.C.

[21] Appl. No.: 442,549

[22] Filed: Nov. 18, 1982

[51] Int. Cl.³ .............................................. C08F 38/02
[52] U.S. Cl. ......................................... 526/75; 526/90
[58] Field of Search .................................... 526/75, 90

[56] References Cited

U.S. PATENT DOCUMENTS

| | | | |
|---|---|---|---|
| 3,463,827 | 8/1969 | Banks | 526/170 |
| 3,474,117 | 10/1969 | Tedeschi | 526/170 |
| 3,790,544 | 2/1974 | Maertens | 252/429 C |
| 3,849,509 | 11/1974 | Streck | 260/677 R |
| 3,935,179 | 1/1976 | Ofstead | 252/429 B |
| 3,974,092 | 8/1976 | Streck | 252/429 B |
| 3,974,094 | 8/1976 | Streck | 252/429 B |
| 4,038,471 | 7/1977 | Castner | 526/142 |
| 4,080,491 | 3/1978 | Kobayashi | 526/137 |
| 4,172,932 | 10/1979 | Ofstead | 526/142 |
| 4,334,048 | 6/1982 | Katz et al. | 526/170 |

*Primary Examiner*—Paul R. Michl
*Assistant Examiner*—Alex H. Walker
*Attorney, Agent, or Firm*—Robert F. Beers; Arthur A. McGill; Prithvi C. Lall

[57] ABSTRACT

Olefin Methathesis is accomplished by combining olefins with acetylenes and tungsten salts such as tungsten hexachloride. This process simplifies olefin metathesis as acetylenes can be handled in the atmosphere, while ethylaluminum dichloride or related materials which have been used in the past instantaneously ignite when exposed to the atmosphere. Furthermore, the acetylenes bring about the reaction with much greater speed than when the initiator is a combination of a metal carbene and an acetylene. Besides, double bonds introduced in the polymer are highly stereoselective.

4 Claims, No Drawings

OLEFIN METATHESIS

BACKGROUND OF THE INVENTION

This invention relates to a novel method for polymerizing olefins using acetylenes as coinitiators and, more particularly, in combination with tungsten salts such as tungsten hexachloride.

The olefin metathesis reaction is indicated by equations (1) and (2) below:

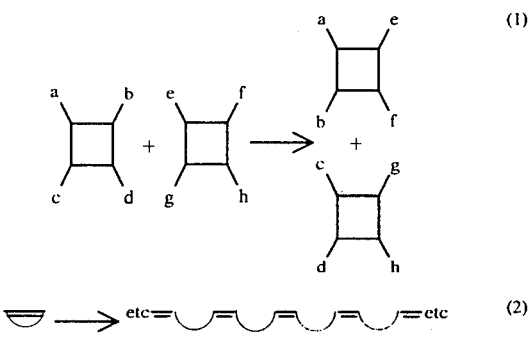

This reaction interconverts olefins that are acyclic as shown in equation (1) and polymerizes those that are cyclic as shown in equation (2). It is commonly brought about by combining tungsten hexachloride with ethylaluminum dichloride and often ethanol as well, although a number of other derivatives of tungsten, molybdenum, rhenium, and other metals have been substituted for the tungsten hexachloride and assorted derivatives of aluminum, tin, or other elements have been substituted for ethylaluminum dichloride.

U.S. Pat. No. 4,334,048, issued to Katz et al., which is incorporated herein by reference, describes procedures for effecting olefin metathesis in which acetylenes are substituted for the organoaluminum halide or related coinitiators. The other component of the initiating mixture in that process was (phenylmethoxycarbene)pentacarbonyltungsten. It would be desirable if acetylenes could be used in place of the organoaluminum halide (or related coinitiators) in combination with tungsten hexachloride instead of phenylmethoxycarbene)pentacarbonyltungsten. The advantage of using tungsten hexachloride instead of (phenylmethoxycarbene)pentacarbonyltungsten is its easy availability and the fact that in combination with ethanol and ethylaluminum dichloride, the reaction proceeds much faster than it does when the combination of (phyenylmethoxycarbene)-pentacarbonyltungsten and an acetylene is used. It is thus desirable to use the acetylenes in combination with some readily available salts as coinitiators to bring about the olefin metathesis.

SUMMARY OF THE INVENTION

According to the teachings of subject invention, olefin metathesis is accomplished by combining olefins and acetylenes and tungsten salts such as tungsten hexachloride.

An object of subject invention is to use acetylenes as coinitiators to bring about olefin metathesis.

Another object of subject invention is to accomplish olefin metathesis in a simplified manner wherein acetylenes used as coinitiators can be handled in the atmosphere, unlike the compounds such as ethylaluminum dichloride or related materials used in the prior art. These latter when exposed to the atmosphere ignite instantaneously.

Still another object of subject invention is to have a method of bringing about olefin metathesis wherein the double bonds are introduced into the product olefins with high stereoselectivity.

Still another object of subject invention is to bring about olefin metathesis in which the acetylenes together with the commonly available tungsten salts are used as coinitiators.

Other objects and novel features of the subject invention are accomplished by illustrating the following examples of the best mode of carrying out the invention. However, it should be clearly understood that these examples should not be construed as being limited on the scope or spirit of the invention. It should further be noted that according to the teachings of subject invention, acetylenes are effective coinitiators for olefin metathesis, but only when used in optimum amounts and in the presence of other coinitiators such as tungsten salts.

EXAMPLE 1

Polymerization of Cyclopentene

Tungsten hexachloride was purified by heating in a nitrogen stream at 130° C. to remove volatile impurities. Chlorobenzene was swirled with NaOH and distilled under nitrogen. Cycloheptene and phenylacetylene were distilled to 99.9% purity. All three of them were then passed through short columns of alumina just before they were used.

Phenylacetylene (63 µL, 0.57 mmol where 1 µL=1 microliter and 1 mmol=1 millimole) was dissolved in 10 mL (114 mmol) cyclopentene, and 1 mL of this solution was combined in a 3.5 mL screwcap vial with 1 mL of a solution (stored under nitrogen) of tungsten hexachloride (229 mg, 0.57 mmol where 1 mg-1 milligram) in 10 mL chlorobenzene. The vial was shaken briefly and after 5 minutes and 20 seconds, methylene chloride was added to the now viscous reaction mixture, whereupon the polymer immediately dissolved. After transfer to a centrifuge tube, methanol was added to precipitate the polymer, which was then centrifuged and washed with methanol until the supernatant solution was colorless. Washing with 5% aqueous ammonia then removed the blue color of tungsten salts leaving a white polymer. Aqueous solutions were then washed away with acetone followed by methanol, and drying in a vacuum (first aspirator, then a mechanical pump) gave 73 mg (9.8% yield) of white polymer.

The infrared (IR) spectrum of a thin film from CHCl$_3$ solution displayed maxima at 1400 cm$^{-1}$ and 960 cm$^{-1}$, whose absorbances were in the ratio of 0.097±0.008, implying that 61.1±2% of the double bonds were cis. The $^1$H NMR spectrum in CDCl$_3$ displayed peaks at 5.36, 2.13, and 1.34 ppm (parts per million), whose intensities were measured as 1.78, 3.79 and 2.43 respectively. Molecular weights determined by GPC (gel permeation chromatography) using a bank of 5 microstyragel columns from Waters Associates (10$^6$, 10$^5$, 10$^4$, 10$^3$ and 500 Å where 1 Å 10$^{-10}$ meter), tetrahydrofuran solutions, and polystyrene samples as calibrants gave weight molecular weight $\overline{M}_w$=155,000, number molecular weight $\overline{M}_n$=89,000, where $\overline{M}_w$ and $\overline{M}_n$ are respectively defined as $\Sigma N_i M^2_i/\Sigma N_i M_i$ and $\Sigma N_i M_i/\Sigma N_i$.

An experiment in which no phenylacetylene was present but which was otherwise identical with the experiment described above gave a minute blue film when methanol was added, but this dissolved completely in the 5% aqueous ammonia. The yield of any polymer obtained was measured as no more than 0.25 mg (0.06%).

The results of similar experiments in which the amounts of phenylacetylene used were varied are summarized in Table 1 which indicates yields and molecular weights of the polypentenamer prepared by combining cyclopentene (200 equivalents), tungsten hexachloride (1 equivalent), and phenylaceyltene (x equivalents) in chlorobenzene whose volume was equal to the volume of cyclopentene.

TABLE 1

| x | Yield (%) | $\overline{M}_n \times 10^{-3}$ |
|---|---|---|
| 0 | 0.12 | 0 |
| 1.25 | 9.6 | 40 |
| 2.5 | 20.5 | 149 |
| 5.0 | 18.9 | 132 |
| 7.5 | 3.2 | 23 |
| 10.0 | 4.0 | 15 |

EXAMPLE 2

Polymerization of Cyclooctene

The procedure in this experiment was identical to that used in Example 1 except for the differences noted below. The concentration of tungsten hexachloride was 155 mg (0.39 mmol) per 10 mL chlorobenzene and that of phenylacetylene was 43 μL (0.39 mmol) per 10 mL cyclooctene (77 mmol). After 1 mL of each of the two solutions were combined, the reaction was allowed to proceed for 19 hours at 30° C. Stirring the reaction mixture ca. 15 mL methylene chloride dissolved it immediately, and the polymer was then precipitated and washed as in Example 1 above. The yield of white solid polymer was 146 mg (16.8%). The ratio of absorbances at 1440 cm$^{-1}$ and 960 cm$^{-1}$ was measured as 0.401±0.034, implying that 86.1±1% of the double bonds were cis. The $^1$H NMR spectrum in CDCl$_3$ displayed peaks at 5.36, 2.05, and 1.33 ppm in intensity ratio 1.80, 3.73 and 8.48. Molecular weights $\overline{M}_w$ and $\overline{M}_n$ were 223,000 and 127,000 respectively.

An experiment in which phenylacetylene was absent but which was otherwise identical to the one described above gave a minute blue film when methanol was added, of which most or all dissolved in the 5% aqueous ammonia. The yield of any polymer obtained was measured as no more than 12 mg (0.9%).

EXAMPLE 3

Polymerization of Cycloheptene

The procedure in this case was identical to the one used in Example 1 except for the differences noted below. No chlorobenzene was used. Instead phenylacetylene (7.1 μL, 0.065 mmol) was dissolved in 1.5 mL cycloheptene, and 1 mL of this solution was combined with 17.6 mg (0.043 mmol) tungsten hexachloride. After 13 hours at 30° C. the reaction mixture had solidified, and after another 11 hours at 30° C. it was stopped. The vial was crushed and its rubbery contents, cut into small pieces, were stirred under nitrogen with 20 mL CH$_2$Cl$_2$ for 41 hours, whereupon all dissolved. After precipitation with methanol, washing with additional methanol, and drying in a vacuum, the yield of white polymer was 488 mg (57.6%).

The ratio of absorbances at 1440 cm$^{-1}$ and 960 cm$^{-1}$ was 0.181±0.006, implying that 73.3±0.7% of the double bonds were cis. The $^1$H NMR spectrum displayed peaks at 5.36, 2.14, and 1.33 ppm whose intensities were in the ratio of 1.90, 3.88, and 6.22.

An experiment in which no phenylacetylene was present, but which was otherwise identical with the one described above, gave a minute blue film when methanol was added, amounting to no more than 6.5 mg. The yield of any polymer obtained was therefore less than this (0.8%).

EXAMPLE 4

Metathesis of cis-2-Pentene

Phenylacetylene (82.3 μL, 0.75 mmol) and n-octane (303 μL, 1.8 mmol) were dissolved in 4 mL cis-2-pentene (99.6% cis, containing 0.25% n-pentene) and 95 μl was added to tungsten hexachloride (1.8 mg, 4.53 μmol) and water (0.081 ml, 4.5 μmol) in a 0.3 mL screw-cap vial. After being shaken briefly (a brownish feathery precipitate appeared), the vial was incubated at 30° C. for 5 hours and cooled in liquid nitrogen until it could be analyzed. The analysis was performed by gas chromatography on 20 feet long, ⅛ inch diameter, 8% TCEP n 100/120 mesh chromosorb P (NAW-not acid washed) after the sample had been warmed for 30 minutes at −15° C. The chromatograph was programmed to maintain 25° C. for 8 minutes, then heated to 125° C., at 25° C. per minute. The analysis showed that the metathesis had proceeded 13% toward equilibrium and the 2-butene was 73% cis and the 3-hexene, 47% cis. Results of the similar experiments in which the amounts of phenylacetylene were varied are summarized in Table 2 which shows the yields and stereochemistries of the products obtained in metatheses effected by combining cis-2-pentene (200 equivalents) phenylacetylene (x equivalents), WCl$_6$ (1 equivalent), H$_2$O (1 equivalent), and octane (10 equivalents)$^a$ at 30° C. for 5 hours.

TABLE 2

| x | % metathesis | cis 2-butenes | cis 3-hexenes | cis 2-pentenes |
|---|---|---|---|---|
| 0 | ≦0.004 | | | 99.4 |
| 0.6 | 1.4 | 84 | 66 | 98.3 |
| 1.2 | 4.4 | 78 | 62 | 97.3 |
| 1.8 | 4.1 | 79 | 64 | 97.6 |
| 2.4 | 28.1 | 66 | 37 | 76.8 |
| 2.8 | 29.5 | 66 | 36 | 75.3 |
| 4.0 | 13 | 73 | 47 | 91.3 |
| 10 | ≦0.0004 | | | 99.6 |

The preceding examples can be reached with similar success by substituting generically or specifically described reactants under operating conditions of the invention for those used in the preceding examples.

From the foregoing descriptions, one skilled in the art can easily ascertain the essential characteristics of this invention and, without departing from the spirit and scope thereof, can make various changes and modifications of the invention to adapt it to various usages and conditions. It is therefore understood that within the scope of the appended claims, the invention may be practiced otherwise than as specifically described.

What is claimed is:

1. A process for polymerizing a cyclic olefin to obtain a highly chemically homogeneous (stereoselective) polymer employing phenyl acetylene as a coinitiator which comprises the steps of:

reacting said olefin with phenylacetylene, both having been passed through short columns of alumina to obtain a mixture;

distilling said mixture into an ampule containing tungsten hexachloride sealing the ampule;

heating the contents of said sealed ampule; and dissolving the contents of said sealed ampule in methylene chloride and precipitating said highly chemically homogeneous polymer therefrom using methanol.

2. The process of claim 1 wherein said cyclic olefin is a member of the group containing cyclopentene, cycloheptene and cyclooctene.

3. The process of claim 2 wherein the amount of phenyl acetylene used as coinitiator varies from 0.0 equivalent to 10.0 equivalent.

4. The process of claim 2 wherein the weight average molecular weight and number average molecular weight vary with the amount of phenyl acetylene used.

* * * * *